Dec. 27, 1938.　　　　E. W. SMITH　　　　2,141,625

STORAGE BATTERY CHARGE INDICATING MEANS

Filed Dec. 21, 1936

WITNESS:
Rob't P. Kitchel.

INVENTOR
Edward W. Smith
BY
Augustus B. Stoughton.
ATTORNEY.

Patented Dec. 27, 1938

2,141,625

UNITED STATES PATENT OFFICE 2,141,625

STORAGE BATTERY CHARGE INDICATING MEANS

Edward W. Smith, Philadelphia, Pa., assignor to The Electric Storage Battery Company, Philadelphia, Pa., a corporation of New Jersey Application December 21, 1936, Serial No. 116,868

2 Claims. (Cl. 265—45)

An object of my invention is to provide simplified and improved means for indicating the state of charge of a storage battery cell by response to the change in specific gravity of the electrolyte, said means comprising one or more indicator bodies or semaphore-blades pivotally mounted within said electrolyte so as to move about their pivots in response to change of specific gravity of the electrolyte.

Another object of my invention is to provide stops for said bodies or blades, which stops prevent the bodies or blades from assuming positions in which the centers of buoyancy of said bodies or blades are directly above or directly below the pivots of said bodies or blades, so that said bodies or blades cannot exert a turning movement about their pivots on change of specific gravity of the electrolyte.

Still another object of my invention is to provide turned ends on said bodies or blades, which ends cause the bodies or blades to be more conspicuous in one position of their path of movement than in the other and to be conspicuous through either of two adjacent transparent walls of the cell.

For a further exposition of my invention, reference may be had to the annexed drawing and specification, at the end thereof my invention will be specifically pointed out and claimed.

Figure 1:
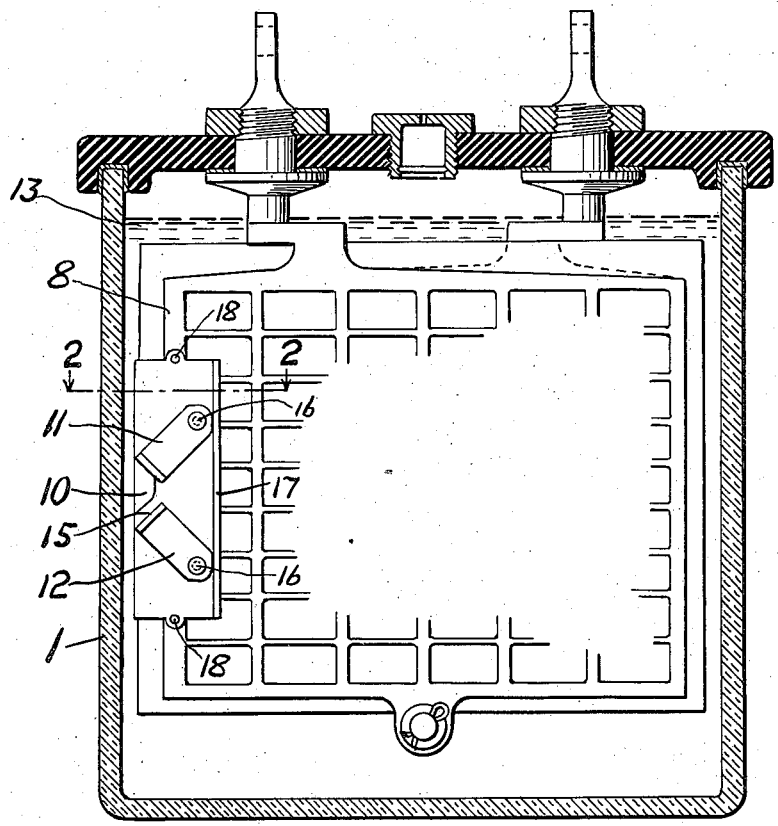
Fig. 1 shows an elevation partly in section of the device.
Figure 2:
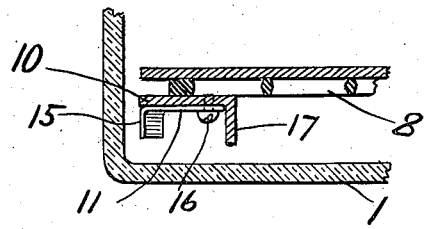
Fig. 2 is a horizontal section on the line 2—2 of Fig. 1.

The charge indicator is mounted in the battery 1 and comprises one or more indicator bodies or semaphore-blades 11 and 12 immersed in the electrolyte 13 and having, in the case of more than one body, different specific gravities but in any case a specific gravity intermediate between the maximum and minimum specific gravity of the electrolyte. Each of these bodies 11 and 12 is designed in the form of a flat member with a turned end 15 and is loosely supported at one end by means of a pin 16 about which it is free to turn in a vertical direction. The pins 16 are supported on a vertical supporting member 10 having a turned edge or flange 17, which projects a greater distance from the face of the support 10 than the turned ends 15 of the indicators 11 and 12 to protect the latter from injury during handling and assembly. The flange 17 also acts as a stop in co-operation with the adjacent end of the indicator 11 or 12 to prevent the indicator from moving into a position where its center of buoyancy will be in the same vertical line as its point of support, in which position it would not respond to changes in the specific gravity of the electrolyte.

Each of the indicators 11 and 12 is either of uniform density throughout its mass or has its center of mass and center of buoyancy in a straight line passing through its point of support. By reason of this, the indicator will occupy either its lower position as shown by indicator 11 or its upper position as shown by indicator 12, depending upon whether the specific gravity of the electrolyte is less or greater than that of the indicator. The indicator will not stop in any intermediate position between the two extremes.

In the design of this device illustrated in the drawing, the upper indicator member 11 would have a somewhat higher specific gravity than that of the lower indicator 12. When the electrolyte reaches its maximum specific gravity corresponding to the fully-charged condition of the battery, both indicators will assume the upper position corresponding to that of indicator 12 in Fig. 1. When the specific gravity of the electrolyte is at its minimum value corresponding to the discharged condition of the cell, both indicators will drop to their lower position corresponding to that of indicator 11 in Fig. 1. For electrolyte specific gravities between those of indicators 11 and 12, these indicators will occupy the positions shown in Fig. 1.

The support 10 as here shown is attached to the vertical margin of the negative plate 8 by rivets 18 but any other suitable method of supporting the member 10 in the cell could be used. Other means than the flange 17 could be employed for stopping the indicators 11 and 12 in their upper and lower positions, respectively, and the angular positions of these indicators when thus stopped may be varied from those shown.

The object of the turned ends 15 of the indicators 11 and 12 is to permit the position of these indicators to be readily observed from the left-hand side of the cell shown in Fig. 1, as well as from the side exposed in the drawing. The position in which these indicators are stopped at the upper and lower extremes of their travel will preferably be such as to make them more conspicuous in one position than in the other. For example, in the design shown in Fig. 1, if the cell is viewed from above and from the left-hand side, the indicators will be more conspicuous when stopped in the upper position illustrated by indicator 12 than when stopped in the lower position as shown by indicator 11. If the cell is to be viewed from other points, the position at which the indicators are stopped can be modified to produce the same results.

I do not intend to be limited save as the scope of the prior art and of the attached claims may require.

I claim:—

1. Means for indicating the state of charge of a storage cell provided with plates, electrolyte and transparent walls, said means comprising, an elongated body having a turned end and of a specific gravity intermediate the maximum and minimum specific gravity of the electrolyte, said body being loosely pivoted at a point remote from its turned end for vertical angular motion, said body being located for visibility of its turned end through one of said walls and for visibility of the remaining portion through another wall.

2. A storage battery charge indicating means comprising, a support mounted on one of the plates of the storage battery and having a turned flange, a pointer having a specific gravity intermediate the maximum and minimum specific gravities of the electrolyte of the storage battery, means forming a pivotal mounting for said pointer about an axis on said support, said means being connected to said pointer adjacent one end thereof and adjacent the said flange, said pointer having flattened portions thereon adjacent said flange to co-operate with said flange to prevent said pointer from assuming a vertical position.

EDWARD W. SMITH.